United States Patent [19]

Schenck

[11] 4,252,086
[45] Feb. 24, 1981

[54] ANIMAL MUZZLE FOR VETERINARY USE

[76] Inventor: Charles T. Schenck, 15 Yorktown Rd., East Brunswick, N.J. 08816

[21] Appl. No.: 16,010

[22] Filed: Feb. 28, 1979

[51] Int. Cl.³ .............................................. A01K 25/00
[52] U.S. Cl. ...................................................... 119/130
[58] Field of Search .............. 119/103, 104, 129, 130, 119/131, 132; 54/10, 71, 80

[56] References Cited

U.S. PATENT DOCUMENTS

| | | | |
|---|---|---|---|
| 368,430 | 8/1887 | Spooner | 54/80 X |
| 435,308 | 8/1890 | Johnson | 119/131 |
| 1,123,018 | 12/1914 | Schubert | 119/104 |
| 1,474,303 | 11/1923 | Veres | 119/130 |
| 3,137,273 | 6/1964 | Greenwood | 119/103 |
| 3,164,131 | 1/1965 | Bradshaw | 119/103 |
| 3,488,772 | 1/1970 | Sturm | 132/1 R X |

FOREIGN PATENT DOCUMENTS

679654   4/1930   France ........................... 119/130

*Primary Examiner*—Gene Mancene
*Assistant Examiner*—Robert P. Swiatek
*Attorney, Agent, or Firm*—Arthur L. Plevy

[57] ABSTRACT

A muzzle particularly adapted for use with cats retains the jaws of the animal while covering the eyes for calming the animal. The muzzle consists of an integral piece of a soft material formed into a truncated cone, with a small top opening and a larger bottom opening. The cone, when positioned on the animal, surrounds the face of the animal with the small opening allowing the animal to breathe while restraining its jaws. The large bottom opening surrounds the head of the animal while covering its eyes. The muzzle is held in position by straps which encircle the head of the animal to selectively position the muzzle.

8 Claims, 6 Drawing Figures

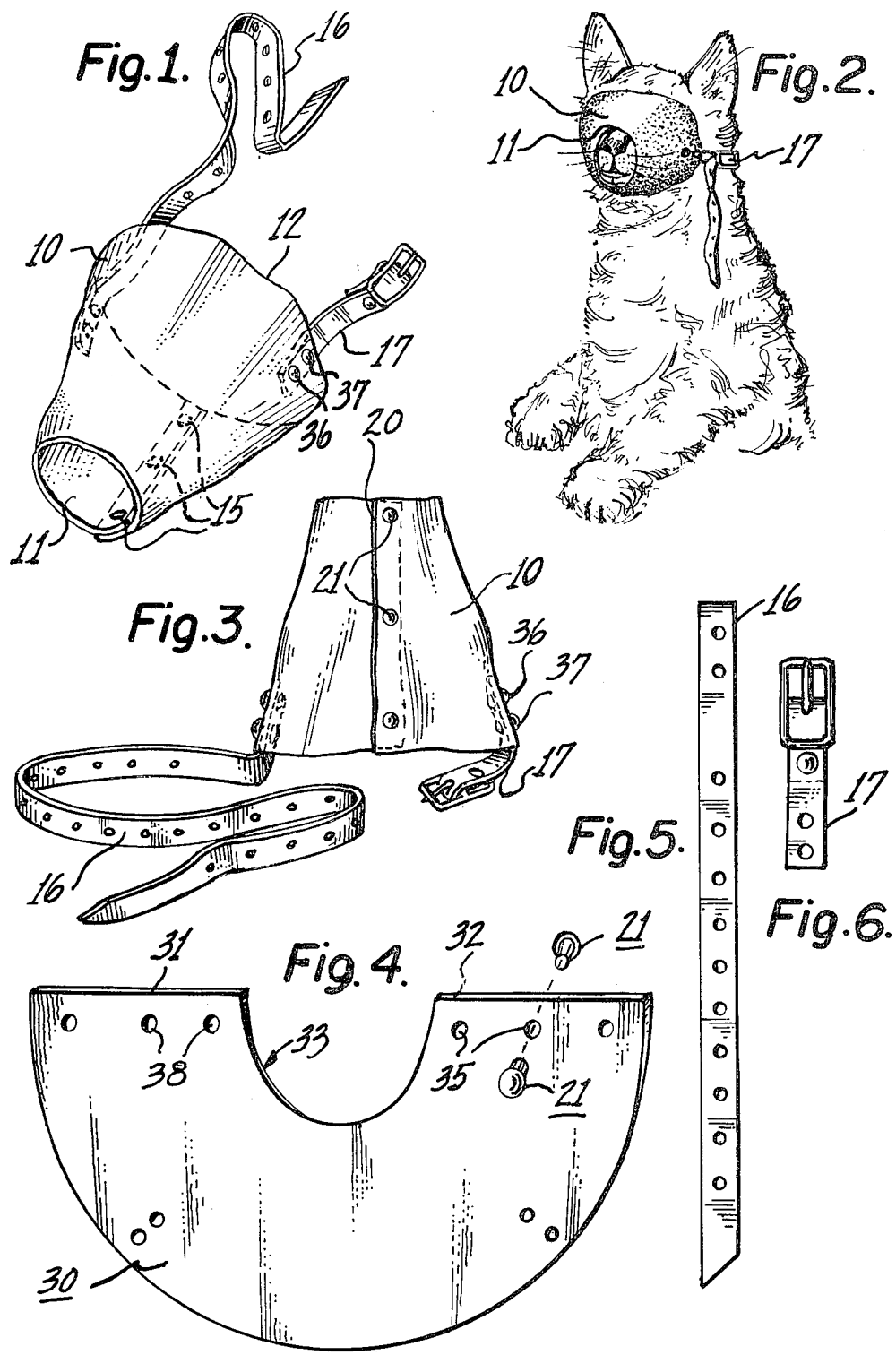

ANIMAL MUZZLE FOR VETERINARY USE

BACKGROUND OF INVENTION

This invention relates to a new and useful improvement in a muzzle for domestic animals and more particularly to a muzzle to be used in conjunction with felines or cats in order to enable a verterinarian to treat the animal without fear of injury.

As is known, domestic animals, especially cats, are widely employed as pets. Such animals are required by law to undergo veterinary checkups for immunization against various diseases as well as the fact that a pet owner will bring the animal to a veterinarian for treatment. It is known that animals such as dogs and cats become extremely nervous and agitated in the presence of a veterinarian. Accordingly, the animal may attack or strike the veterinarian, the owner or various other staff members to cause injury and hence, to subject the practitioner to liability. In order to circumvent such injuries, many veterinarians employ muzzles which are conventional and are known in the prior art. It has been determined that a pet owner becomes extremely concerned in regard to the safety of his animal when such a muzzle is employed. Many muzzles which exist in the prior art are relatively complicated and unattractive devices and create a great feeling of apprehension in regard to the pet owner when such muzzles are employed to restrain the pet. Examples of such typical muzzles may be had by reference to U.S. Pat. No. 855,856 entitled MUZZLE, U.S. Pat. No. 1,474,303 entitled DOG MUZZLE and so on.

Essentially, the prior art muzzles consist of a plurality of straps and restraining members which were emplaced about the snout of the animal and secured about the head of the animal by means of a plurality of devices. As indicated, many pet owners seriously object to the use of such muzzles and hence, make it difficult for the veterinarian to optimumly and adequately administer to the physical needs of the animal.

In the case of cats or felines, there is no known muzzle which is available in the marketplace to restrain or to muzzle a cat. The necessity of doing so is apparent as cats have extremely sharp teeth which are capable of inflicting severe injuries.

Many prior art muzzles severely restrict the breathing capability of animals. This is an extreme disadvantage in a veterinarian operation as the animal, due to anxiety and so on, breathes more rapidly and hence, the muzzle should allow the animal to breathe as optimumly as required.

It is further desirable that the muzzle be capable of covering the eyes of the animal. Covering of the eyes in the case of felines is extremely advantageous as it has a calming effect on the animal.

It is therefore an object of the present invention to provide an improved muzzle which is simple to construct, easy to use, and avoids the many disadvantages associated with prior art muzzles.

BRIEF DESCRIPTION OF THE PREFERRED EMBODIMENT

A muzzle for animals undergoing veterinarian treatment, comprising a truncated cone face portion fabricated from an integral piece of a soft material of a relatively "U" shaped configuration, with the arms of said "U" overlapping and joined together to form said truncated cone having an open top end and a large open bottom end, said open top end dimensioned to encircle the mouth and nose of the animal with said open bottom end adapted to cover the eyes of said animal when said muzzle is in position on said animal, strap means coupled to said truncated face portion at said bottom end and adapted to encircle the head of said animal when said muzzle is worn to secure said muzzle in position.

BRIEF DESCRIPTION OF THE FIGURES

FIG. 1 is a perspective plan view of a muzzle according to this invention.

FIG. 2 is a plan view of a muzzle emplaced upon an animal.

FIG. 3 is a bottom view of the muzzle.

FIG. 4 is a top plan view of a "U" shaped planar member forming the main portion of the muzzle.

FIGS. 5 and 6 are top views showing the strap assembly used to secure the muzzle about the head of an animal.

DETAILED DESCRIPTION OF THE INVENTION

Referring to FIG. 1, there is shown a perspective view of a muzzle according to this invention. The main face portion 10 of the muzzle consists of a truncated cone configuration which is formed from an integral piece of a soft flexible material, such as leather or a suitable vinyl plastic. The section 10 has a small top opening 11 and a larger bottom opening 12.

As indicated, the muzzle is formed from an integral piece of material with the ends of the material overlapping one another and secured together by means of fasteners 15. A first strap 16 is secured to a side of the face portion 10 near the open bottom 12 and a coacting strap and buckle 17 are secured at the opposite side.

Referring to FIG. 2, there is shown the muzzle emplaced and accommodated by an animal which in this example, is a cat. As seen, the open bottom end 11 encircles the mouth and nose of the animal. In this manner, the animal can breathe freely while its jaws are restrained by the dimensions of the muzzle.

The face portion 10 is of a truncated cone shaped configuration and extends upwardly surrounding the face of the animal with the peripheral portion adjacent the open bottom end 12 covering the eyes of the animal. The straps are shown secured about the back of the head of the animal to hold the muzzle in position. Due to the use of the soft flexible material and the cone shaped structure, the muzzle conforms to the contours of the animal's face and serves to restrain the jaws of the animal, while simultaneously covering the eyes of the animal.

The smaller opening 11 allows the animal to breathe freely and its entire nose and mouth area is exposed. This aspect allows the pet or animal to breathe freely without undue restraints as would be imposed by prior art muzzles.

FIG. 3 shows a bottom view of the muzzle where the ends of the integral piece of leather are fastened together at their edges indicated by numeral 20 and secured in place by means of rivet-like members 21.

Shown in FIG. 4 is a planar sheet of soft material 30 which is of a "U" shaped appearance. The planar structure 30 has relatively wide arms as 31 and 32 and a central "U" shaped portion 33 which forms the small top opening 11. The top of the arms each has a plurality of apertures as 35 and 38 formed therein. Planar member 30 is folded so that the arms overlap with the apertures coacting one with the other to form the truncated cone shape 10 constituting the major portion of the muzzle body. A rivet body 21 is inserted within the apertures 35 and 38 to secure the ends together to form the integral structure as shown in FIGS. 1 through 3.

FIGS. 5 and 6 depict the straps 16 and 17 which are then secured to appropriate sides of the muzzle as shown in FIG. 3 by means of rivets 36 and 37 which are identical to the rivets 21 as used to secure the ends of the "U" shaped member together.

It is thus seen that the muzzle is very simple in appearance and extremely efficient in use. The muzzle requires only one buckle associated with strap 17 to secure the same to the pet. The muzzle slips over the nose of the animal in a single movement and is very easy to apply. The animal will not reject the muzzle as based on the shape of the muzzle and the use of the soft leather material, the animal does not feel restricted and hence, will accept the muzzle. The breathing of the animal is not restricted as the mouth and nose of the animal are completely uncovered due to the encircling of the same by the small top opening.

Based on the simplicity of the muzzle which is basically constructed from three pieces of leather, the muzzle presents a pleasing appearance and hence, provides a reduced apprehension on the part of a pet owner when the muzzle is employed with a pet. Based on the fact that the muzzle covers the eyes of the animal, it therefore provides an extremely calming effect to the animal and hence, allows the veterinarian or other practitioner to administer to the needs of the animal without fear of being injured. This therefore reduces the risk to the veterinarian and his staff members and allows him to expeditiously and safely treat the animal.

As indicated above, based on the extreme simplicity of the design, the muzzle can be rapidly emplaced as compared to prior art muzzles and hence, requires a minimum amount of time in positioning the muzzle on the animal.

I claim:

1. A muzzle for animals particularly for animals of the feline class undergoing veterinarian treatment, consisting essentially of:
   (a) a truncated cone face portion fabricated from an integral piece of a relatively soft material of a planar "U" shaped configuration, with the arms of said "U" joined together to form said truncated cone, having a first smaller open top and a large open bottom end, said open top dimensioned to encircle the mouth and nose of the animal, to allow the animal to breathe while preventing the animal from biting, said large open bottom end adapted to cover the eyes of said animal to completely prevent vision when said muzzle is accommodated by the animal with said smaller top end encircling the mouth and nose of said animal,
   (b) first strap means coupled to said face portion at said bottom end, second strap means coupled to said face portion opposite to said first strap means including a fastener to coact with said first means to hold said muzzle in place about the head of the animal accommodating said muzzle, with only said first and second strap means employed solely to hold said muzzle in place.

2. The muzzle according to claim 1 wherein said soft material is leather.

3. The muzzle according to claim 1 wherein said arms of said "U" shaped configuration are joined together by means of rivets.

4. The muzzle according to claim 1 wherein said first and second strap means are coupled to said face portion by means of rivets.

5. A muzzle for animals particularly of the feline class undergoing veterinarian treatment, comprising:
   (a) a truncated cone face portion fabricated from an integral place of a soft material of a relatively "U" shaped configuration, with the arms of said "U" overlapping and joined together to form said truncated cone having an open top end and a large open bottom end, said open top end dimensioned to encircle the mouth and nose of the animal with said open bottom end adapted to cover the eyes of said animal to completely prevent vision when said muzzle is in position on said animal, first and second strap means coupled to said truncated face portion at said bottom end and adapted to encircle the head of said animal when said muzzle is worn to secure said muzzle in position.

6. The muzzle according to claim 5 wherein said soft material is leather.

7. The muzzle according to claim 5 wherein each of said arms of said "U" have coacting apertures therein and means inserted through said apertures to join said arms together.

8. The muzzle according to claim 7 wherein said means inserted in said apertures are rivets.

* * * * *